May 12, 1936.  J. J. GOUGH  2,040,371
ELECTRIC MOTOR
Filed Sept. 26, 1934  2 Sheets—Sheet 1

Inventor:
James J. Gough
by Albert Scheible
Attorney

May 12, 1936. J. J. GOUGH 2,040,371
ELECTRIC MOTOR
Filed Sept. 26, 1934   2 Sheets-Sheet 2
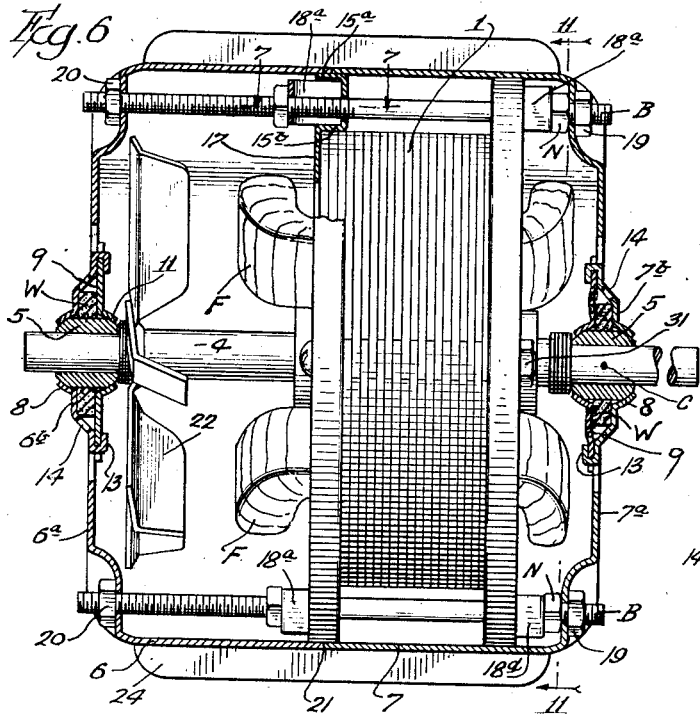
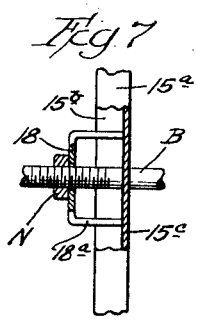
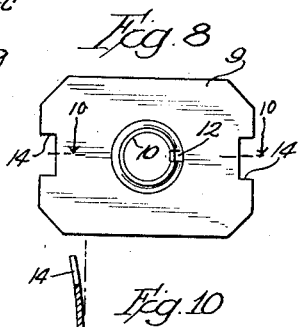
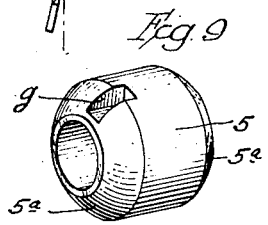
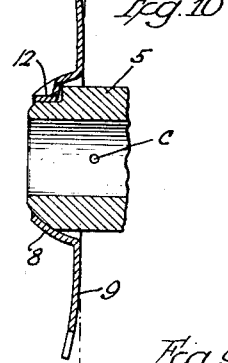
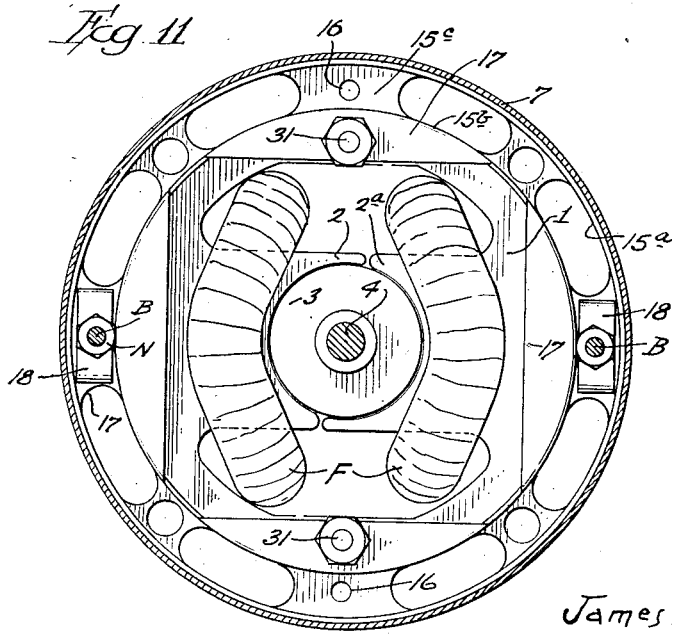
Inventor:
James J. Gough
by Albert Scheith
Attorney Patented May 12, 1936

2,040,371

UNITED STATES PATENT OFFICE 2,040,371

ELECTRIC MOTOR

James J. Gough, Chicago, Ill., assignor to Chicago Electric Manufacturing Company, Chicago, Ill., a corporation of Illinois Application September 26, 1934, Serial No. 745,548

4 Claims. (Cl. 172—36)

My invention relates to an electric motor of the class in which the stator is housed by a casing and in which the motor includes a supporting member, such as a base or bracket.

In its general objects, my invention aims to provide a simple, inexpensive and easily assembled motor and base construction in which the attaching of two longitudinal halves of the motor casing to the base alines these casing halves and also alines bearings respectively mounted on the two casing halves, in which the stator is supported conjointly by the two casing halves in axial alinement with the said bearings, and in which the major portions of the stator are freely spaced from the casing to permit air to flow therebetween.

Furthermore, my invention aims to provide simple and effective means for supporting an exteriorly cylindrical stator within and coaxial with a two-part casing of larger bore than the exterior diameter of the stator, simple means for securing the two casing parts rigidly to each other and to the stator, and simple means for supporting self-alining bearings respectively from the said parts of the casing and for affording an adequate lubrication of these bearings.

Illustrative of the manner in which I accomplish the above recited provisions as well as more detailed objects, Fig. 1 is a side elevation of an alternating current motor embodying my invention.

Fig. 6 is horizontal section taken along the axis of the motor shaft, drawn on a still larger scale than Fig. 3.

Fig. 7 is a fragmentary horizontal section taken along the line 7—7 of Fig. 6.

Fig. 8 is an elevation of one of the bearing-supporting plates.

Fig. 9 is an enlarged perspective view of one of the bearings.

Fig. 10 is an enlarged section taken along the line 10—10 of Fig. 8 through one of the bearing-supporting plates and part of the adjacent bearing, showing the shape of this plate before it is attached to a casing end.

Fig. 11 is a vertical section on the line 11—11 of Fig. 6.

Figure 1:
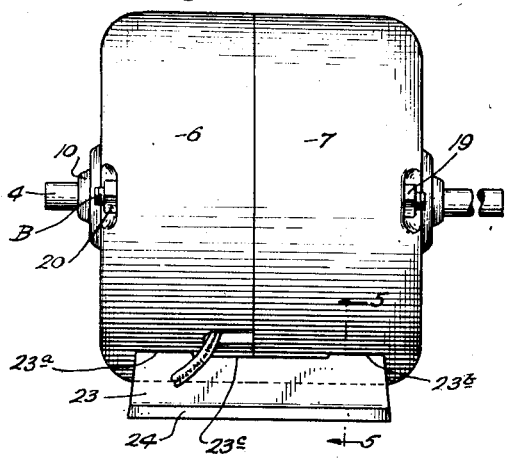

In the illustrated embodiment, the exteriorly cylindrical stator 1 consists of alined laminations formed, after the manner of my United States Patent #1,943,270 (of January 3, 1934) to present poles 2 and 2a conjointly housing a rotor 3 fastened to a shaft 4, these poles being magnetized by the usual field coils F.

The motor shaft 4 is journaled in two bearings 5, each supported by and coaxial with one of the two cap-like casing members 6 and 7 which I am here calling casing halves although they need not be of precisely the same depth. Each casing half has its cap end (6a or 7a) provided with a central bore of larger diameter than the said shaft 4 and has the inner face of the cap end part 8 surrounding that bore formed as a portion of a spherical surface fitting the hereafter described convexed end portion 5a of one of the said bearings, and each casing half has its peripheral (or cap side) portion bore and the same outside diameter as that of the other casing half.

Each bearing comprises a tube 5 having both ends 5a thereof convexed to form part of a spherical surface which has its center on a point C on the axis of the bearing and at the mid-length of the latter, as ndicated in Fig. 6.

To support each bearing 5 on the adjacent end portion of one of the casing halves and to provide lubrication for the bearing, I desirably also form each cap end (6a or 7a) to include an annular portion (6b or 7b) surrounding the said fragmentary spherical portion 8. This annular portion has its inner face flat and offset outwardly from the plane of the inner face of the major end portion 7a of the casing half, as shown in Fig. 6. After the corresponding bearing has its outer convexed end 5a or 5b socketed in one of the similarly curved casing end portions 8, I slip a felt washer W over the bearing. I then clamp this washer against the said flat annular portion (6b or 7b) by a generally flat retainer-plate 9 (Fig. 8) which is provided with a central bore 10, and which plate has the portion surrounding this bore of a fragmentary spherical shape fitting the inner end 5a (Fig. 9) of the bearing, this plate portion being desirably a counterpart of the portion 8 of the adjacent casing end.

Then I clamp the retainer plate of the end portion (6a or 7a) of the adjacent casing half by fingers 13 integral with the said plate 9, each of which fingers is hooked over the bottom of a notch 14 in the said plate and fits laterally against the edges of that notch. I also provide the bearing with a longitudinal surface groove g, as in Fig. 9, and provide the portion 10 of the bearing plate with a finger-like portion 12 indented into the groove g on the bearing to prevent the bearing from rotating.

To allow for manufacturing variations, both in the dimensions of the parts and in the clinching of the retainer plate to the casing end, I preferably make the retainer plate of resilient metal, and with its outward face convexed as in Fig. 10.

Thus constructed, each bearing-supporting plate presses yieldingly against a bearing to allow the latter to rock in any direction about its center point C, thereby insuring an alining of the two bearings, and each such plate also cooperates with the adjacent casing end for housing a felt washer to which oil can be supplied through an oil port 14 in the casing end.

To aline the two bearing-supporting casing halves both with each other and with the stator 1, and to support this stator concentric with and generally freely spaced from the casing, I provide the ring, stirrup and bolt arrangement shown in Figs. 6, 7 and 11. This arrangement includes two sheet metal rings, each of which has its radially outer portion formed into a trough, the outer trough wall 15a having a cylindrical outer face fitting the bore of the tubular part (6 or 7) of one of the casing halves, and the inner trough wall 15b having its inner face slidably fitting the periphery of the stator 1.

The trough bottom 15c of each such ring is provided with at least one pair of spaced bores 16 for receiving the shanks of bolts B which connect the two casing halves. This through bottom also desirably has a plurality of perforations 17 through which air can flow between the periphery of the stator 1 and the adjacent casing parts. Extending radially inward from the free edge of the inner trough wall 15b are flanges 17, desirably segmental in shape and uniformly distributed about the axis of the rings, each of which flanges bears flatwise against the adjacent end of the stator. These flanges serve conjointly after the manner of an annular flange extending radially inward from the said trough, being formed as segments only to afford more clearance for the stator coils F, it being believed obvious without separate picturing that the said flanges might be interconnected into a continuous annular flange.

To clamp the two rings conjointly to the stator with the aid of bolt shanks B, each of which extends through alined perforations 16 in the bottoms of the trough portions of the two rings, I provide stirrups as shown in Figs. 6, 7 and 11. Each of these stirrups has its stirrup-back 18 provided with a perforation through which a bolt shank can be slid, and has its legs 18a seated on the bottom of one of the said trough portions as shown in Fig. 7. Then I clamp each stirrup against the bottom of the adjacent trough by a nut N threaded on the corresponding bolt shank, as shown in Figs. 6 and 7. In practice, I have found two such sets of bolt shanks, stirrups and nuts to suffice, both for clamping the two rings conjointly to the stator and for securing the resulting assembly to both halves of the casing as hereafter described, although a larger number of such sets might be used if desired—as by also having such bolts in the upper and lower trough bottoms 16 in Fig. 11 which are not shown as having bolt shanks extending through them.

To support the resulting stator and ring assembly within a casing having two cup-like parts slidably fitting the outer trough walls of the said rings, I desirably utilize the same bolt shanks B by making them considerably longer than the spacing between the heads 19 and nuts N on each bolt shank, and by providing the casing halves also with bores through which the same bolt shanks extend.

Thus, Fig. 6 shows each bolt shank B as extending also through alined perforations in the ends 6a and 7a of the two casing halves. Outer nuts 19 threaded on these bolts clamp the casing end 7a against the adjacent inner nuts N, while nuts 20 threaded on the opposite ends of the bolt shanks engage the outer face of the end 6a to clamp the two casing halves (which have their mouth ends abutting at 21) tightly against each other.

Figure 2:
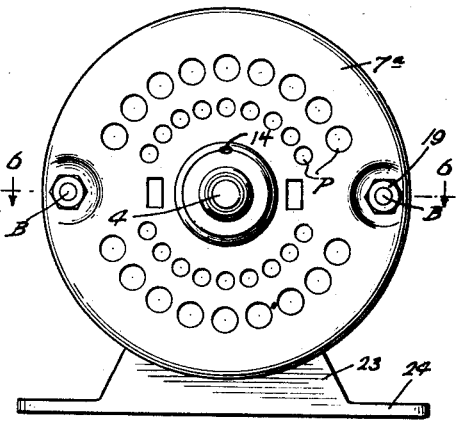
Fig. 2 is an end view of the same motor.
Figure 3:
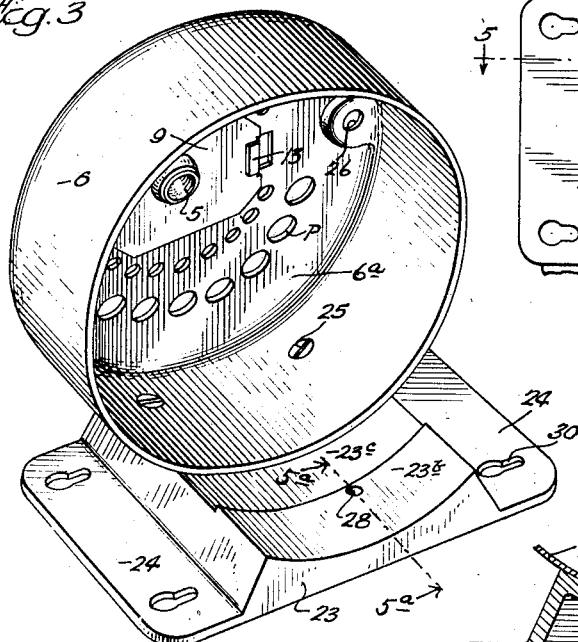
Fig. 3 is an enlarged perspective view of the base and of the casing half which is attached first to the base during the assembling of the motor.
Figure 4:
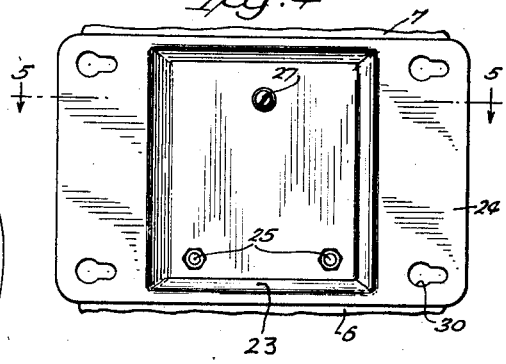
Fig. 4 is a bottom view of the motor, drawn on the same scale as Figs. 1 and 2.

In practice, the relative spacing of the two rings from the adjacent ends of the casing can obviously be varied by varying the lengths of the stirrups and the positions of the nuts on the bolt shanks. Thus, my arrangement can readily afford room for a fan 22 disposed within the casing and fastened to the motor shaft 4, for forcing air through the casing to cool the motor, when each casing end has suitable air ports P as shown in Figs. 2 and 3. However, I preferably proportion the parts so that one of the said rings—such as the left-hand ring in Fig. 6—will overlap the juncture 21 of the mouth ends of the two rings to aid in alining the two casing halves, thereby permitting these rings to be formed from thin metal.

Figure 5:
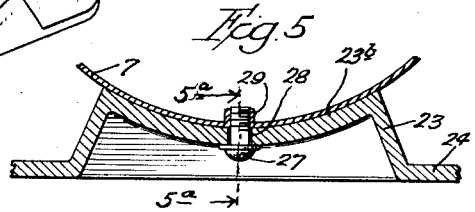
Fig. 5 is a vertical section, taken along the line 5—5 of Fig. 4 through the base and a portion of the adjacent half of the casing, drawn on the same scale as Fig. 3.
Figure 5A:
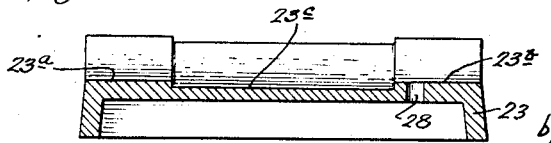
Fig. 5a is a vertical section taken through the base along the line 5a—5a of Figs. 3 or 5, drawn on a larger scale than Fig. 3.

To support my heretofore described assembly, I preferably employ a base or other supporting member which has spaced portions thereof curved to fit against the tubular parts of the two casing halves. Thus, Figs. 1 to 5 show a base including an inverted boxlike central portion 23, and two side flanges 24 provided with bolt-receiving apertures 30. The central portion 23 has the upper faces 23a and 23b of its two end portions concaved upwardly to form portions of a cylindrical surface corresponding in diameter to the exterior of the tubular casing portions 6 and 7, while the intervening upper face portion 23c is desirably offset downwardly from the said alined face portions 23a and 23b, as shown in Fig. 5a.

In assembling the motor on such a base, one casing half is first set on one of the said higher portions 23a and fastened to the latter by bolts 25 which extend through the tubular portion 6 of that casing part and have their bolt shanks inserted from the interior of the said casing part before this casing part of Fig. 6 was clamped to other parts by the nuts 20, but after the assemblage of that figure had been made except for the left-hand nuts 20 and the base, of which base a base flange 24 is shown in that figure.

The incomplete assemblage of the entire motor, the two rings and the right hand casing part and bearing assembly of Fig. 6 is then slid upon the base shown in Fig. 3 so as to slip the motor shaft 4 through the bore of the bearing and also to slip the bolt shanks B through the corresponding perforations 26 in the end 6a of the casing part 6 which has already been fastened to the base, in doing which the casing part 7 (to which the stator is already clamped by the previously described bolt, ring and stirrup assembly) is slid upon the riser part 23b of the base until the mouth ends of the two casing halves abut against each other. The left-hand nuts 20 of Fig. 6 are then affixed to the bolt shanks B and tightened so as to have the said mouth ends of the two casing parts completely engage each other, after which a screw 27 (Fig. 5) is inserted upwards through a bore 28 in the said base part and threaded into an interior hollow boss 29 formed on the tubular part 7 of the last attached casing half.

When the motor is thus assembled, the abutting of the two casing halves cooperates with the aligning of the upper face of the higher riser parts 23a and 23b to aline the two bearings 5, and the two bolts 25 (Figs. 3 and 4) cooperate with the screw 27 (Fig. 5) to anchor the motor and casing assembly to the base. Moreover, when one of the stator-clamping rings is disposed (as shown for the left-hand ring in Fig. 6) so as to be sleeved conjointly by the mouth-end portions of the two casing halves, the interfitting of the said ring with the mouth portions of these casing halves also aids in this alining, so that I can readily obtain an axial alining of the two bearings with the stator core without requiring any bearing-supporting brackets to be mounted on the stator core. Moreover, by thus supporting the bearings from the casing ends, instead of having them supported by the stator core, I make it much easier for the user to lubricate the bearings, since it is usually difficult (particularly for inexperienced persons) to fill a concealed oil inlet without wasting part of the oil.

Since the casing parts, the spacer rings and the bearing-retaining plates and the stirrups are all simple stampings, and since the bearings also can be expeditiously manufactured, the entire construction of my here disclosed stator-core and motor supporting parts is quite inexpensive and quite little skill suffices for the assembling.

Moreover, it will be obvious that many changes from the above detailed construction might be made without departing either from the spirit of my invention or from the appended claims.

I claim as my invention:

1. In an electric motor, a stator core, two frame members sleeved upon longitudinally spaced parts of the stator core, each frame member including as its radially outer part a tubular portion coaxial with and of larger diameter than the stator core; and two cap-like casing parts having their mouth ends facing each other and having the mouth end portions of both casing portions sleeved upon the tubular portion of one only of the frame members, one of the casing portions having a part thereof sleeved upon the tubular portion of the other frame member; and plural means rigidly spanning the ends of the two cap-like casing parts and clamped to both of the annular members for rigidly spacing the stator core from the said casing ends, each of the said means having a portion thereof extending through the space within the casing radially outward of the stator core.

2. In an electric motor of the type in which an exteriorly cylindrical stator core is housed by and spaced from two axially alined cup-like casing halves which have cylindrical cup walls and which have their cup mouth ends abutting against each other, means for supporting the stator core in rigidly spaced relation to the said casing halves; the said means comprising: two annular members each sleeved snugly upon one end of the stator core and each having radially inwardly directed portions bearing against the adjacent end of the stator core, each annular member having the cup wall of one casing half snugly sleeved upon its periphery; bolt shanks each extending through the cup ends of both casing halves, and through a portion of each annular member radially outward of the stator core; and means associated with each bolt shank for clamping the two casing halves against each other and for clamping the said flanges on the annular members respectively against opposite ends of the stator core.

3. An electric motor part assemblage as per claim 2, in which each annular member comprises a channel-sectioned part having its channel opening toward a cup-bottom of the adjacent casing half, and a flange extending radially inward of that member from the free edge of the inner wall of the channel thereof; and in which each of the flange-clamping means comprises a rigid spacer seated in the channel of an annular member and a nut threaded on the bolt and bearing against the outward face of the spacer, whereby the said nut serves to clamp the annular member against the adjacent end of the stator core.

4. In an electric motor of the type in which an exteriorly cylindrical stator core is housed by and spaced from two axially alined cup-like casing halves which have cylindrical cup walls and which have their cup mouth ends abutting against each other, means for supporting the stator core in rigidly spaced relation to the said casing halves; the said means comprising: two annular members each comprising a channel-sectioned portion having its radially inner channel wall sleeved upon one end of the stator core and having its channel mouth open toward the cup bottom of one casing half, and having the cylindrical cup wall of that casing half sleeved upon the radially outer channel wall; each annular member also having webs extending radially inward of that member from the mouth end of its inner channel wall, and having the said webs bearing against an end of the stator core; bolts each extending longitudinally of the stator core through the said core and through webs of both annular members to clamp the core between the said webs of the two annular members; and auxiliary means operatively interposed between the cup-bottoms of the two casing halves for rigidly maintaining the aforesaid stator core and annular member assemblage in a definite position longitudinally of the axis of the two casing halves, the said auxiliary means including bolts extending entirely through the casing from one cup-bottom to the other and having a part of each bolt extending through the space between the periphery of the stator core and the cylindrical wall of at least one casing half.

JAMES J. GOUGH.